（12）United States Patent
Olenoski et al.

(10) Patent No.: US 10,491,699 B2
(45) Date of Patent: Nov. 26, 2019

(54) PARSING TRANSACTION INFORMATION FOR EXTRACTION AND/OR ORGANIZATION OF TRANSACTION-RELATED INFORMATION

(71) Applicant: Capital One Services, LLC, McLean, VA (US)

(72) Inventors: Michelle Olenoski, Washington, DC (US); Patrick Zearfoss, Leesburg, VA (US); Jon Whitmore, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 68 days.

(21) Appl. No.: 15/926,604

(22) Filed: Mar. 20, 2018

(65) Prior Publication Data

US 2019/0297158 A1    Sep. 26, 2019

(51) Int. Cl.
*G06Q 40/00* (2012.01)
*H04L 29/08* (2006.01)
*G06Q 20/02* (2012.01)
*G06Q 20/36* (2012.01)

(52) U.S. Cl.
CPC .............. *H04L 67/26* (2013.01); *G06Q 20/02* (2013.01); *G06Q 20/36* (2013.01)

(58) Field of Classification Search
CPC .......................... G06Q 40/00; G06Q 30/0264
See application file for complete search history.

(56) References Cited

U.S. PATENT DOCUMENTS

| | | | | |
|---|---|---|---|---|
| 8,538,824 B1* | 9/2013 | McKay | .............. | G06Q 30/0264 705/26.1 |
| 9,864,351 B2* | 1/2018 | Slupik | ................. | H04L 12/2816 |
| 9,911,155 B1* | 3/2018 | Gupta | .................... | G06Q 40/00 |
| 2013/0110678 A1* | 5/2013 | Vigier | .................... | G06Q 30/06 705/26.61 |

OTHER PUBLICATIONS

McCandless, Karen (How to Choose the Right Subscription Billing App for Your Small Business, https://www.getapp.com/blog/billing-subscriptions-saas/ Aug. 27, 2015) (Year: 2015).*

* cited by examiner

*Primary Examiner* — Bruce I Ebersman
*Assistant Examiner* — Mark H Gaw
(74) *Attorney, Agent, or Firm* — Harrity & Harrity, LLP

(57) ABSTRACT

A device may receive transaction information related to a transaction in association with the transaction being completed. The device may identify a set of identifiers included in the transaction information. The device may determine a time of interest associated with the transaction based on the set of identifiers included in the transaction information. Different identifiers or different combinations of identifiers included in the set of identifiers may be associated with different times of interest. The device may prompt, via a display associated with a remote computing device by providing instructions associated with a user interface for display via the display, a user of the remote computing device to indicate whether to generate a calendar reminder for the time of interest after determining the time of interest. The device may perform an action after receiving a response to the prompt from the user of the remote computing device.

20 Claims, 5 Drawing Sheets

PARSING TRANSACTION INFORMATION FOR EXTRACTION AND/OR ORGANIZATION OF TRANSACTION-RELATED INFORMATION

BACKGROUND

An electronic wallet refers to an electronic device that allows an individual to make electronic transactions. This can include purchasing items or services on-line with a computer device, or using a smartphone to purchase items or services. An individual's bank account and/or other accounts can be linked to the electronic wallet.

SUMMARY

According to some possible implementations, a method may comprise receiving, by a device, transaction information related to a transaction based on the transaction being completed. The method may include processing, by the device, the transaction information to identify a set of identifiers included in the transaction information after receiving the transaction information. The set of identifiers may include at least one of a first identifier that identifies a third party associated with the transaction, a second identifier that identifies a type of the transaction, or a third identifier that identifies an account that was used to complete the transaction. The method may include determining, by the device, a time of interest associated with the transaction based on the set of identifiers included in the transaction information. Different identifiers or different combinations of identifiers included in the set of identifiers may be associated with different times of interest. The method may include generating, by the device, a calendar reminder for the time of interest after identifying the time of interest. The method may include providing, by the device, a notification for display after generating the calendar reminder. The notification may include information that identifies the time of interest.

According to some possible implementations, a device may comprise one or more memories, and one or more processors, communicatively coupled to the one or more memories, configured to receive transaction information related to a transaction in association with the transaction being completed. The one or more processors may process the transaction information to identify a set of identifiers included in the transaction information after receiving the transaction information. The one or more processors may determine a time of interest associated with the transaction based on the set of identifiers included in the transaction information after processing the transaction information. Different identifiers or different combinations of identifiers included in the set of identifiers may be associated with different times of interest. The one or more processors may prompt, via a display associated with a remote computing device by providing instructions associated with a user interface for display via the display, a user of the remote computing device to indicate whether to generate a calendar reminder for the time of interest after determining the time of interest. The one or more processors may perform an action after receiving a response to the prompt from the user of the device.

According to some possible implementations, a non-transitory computer-readable medium may store one or more instructions that, when executed by one or more processors, may cause the one or more processors to receive transaction information related to a transaction after the transaction has been completed. The one or more instructions, when executed by the one or more processors, may cause the one or more processors to process the transaction information to identify a set of identifiers included in the transaction information after receiving the transaction information. The one or more instructions, when executed by the one or more processors, may cause the one or more processors to determine, after processing the transaction information, at least one of a priority for the set of identifiers, or a score for the set of identifiers. The one or more instructions, when executed by the one or more processors, may cause the one or more processors to determine a time of interest associated with the transaction based on the priority or the score. The one or more instructions, when executed by the one or more processors, may cause the one or more processors to generate a calendar reminder for the time of interest after identifying the time of interest. The one or more instructions, when executed by the one or more processors, may cause the one or more processors to populate an electronic calendar with the calendar reminder after generating the calendar reminder. The one or more instructions, when executed by the one or more processors, may cause the one or more processors to perform an action after populating the electronic calendar with the calendar reminder.

DETAILED DESCRIPTION

The following detailed description of example implementations refers to the accompanying drawings. The same reference numbers in different drawings may identify the same or similar elements.

An organization may process thousands, millions, or more transactions per day for thousands, millions, or more individuals (e.g., thousands, millions, or more sales for thousands, millions, or more customers). Individuals may want to return, and/or obtain a refund for, items and/or services associated with these transactions. However, different items and/or services may be associated with different deadlines for returning, and/or obtaining a refund for these items and/or services. The volume and complexity associated with managing deadlines for thousands, millions, or more transactions can result in inadvertently missed deadlines, incorrectly applied deadlines, and/or the like. This results in significant consumption of computing resources associated with attempting to return, and/or obtain a refund for an item and/or a service when such a return and/or refund is no longer possible, wasted fuel resources (e.g., from a customer driving to a retail location to attempt to return, and/or obtain a refund for an item or service when no longer possible, shipping an item that can no longer be returned, etc.), reduced customer satisfaction (e.g., due to customers inadvertently missing return and/or refund deadlines), and/or the like.

Some implementations described herein provide a device (e.g., a user device or a transaction backend device) that is capable of intelligently identifying times of interest for hundreds, thousands, or more transactions (e.g., return deadlines, expiration dates, etc.) and efficiently managing the times of interest on behalf of entities (e.g., individuals, organizations, governmental entities, etc.) associated with the transactions. This conserves computing resources that would otherwise be consumed via a failed attempt to obtain a return and/or a refund for an item and/or a service associated with a transaction. In addition, this reduces or eliminates waste related to inadvertently missing a time of interest related to an item and/or a service (e.g., money spent on an unused item and/or a service, expired items, unusable items for which a return and/or a refund can no longer be obtained, etc.). Further, this conserves other resources (e.g., fuel, time, etc.) associated with a failed attempt to obtain a return and/or a refund for an item and/or a service (e.g., due to missing a time of interest). Further, this improves customer satisfaction related to completing a transaction by reducing or eliminating missed times of interest (e.g., return deadlines, expiration dates, etc.), by intelligently managing a large quantity of times of interest for a customer, and/or the like.

Figure 1:
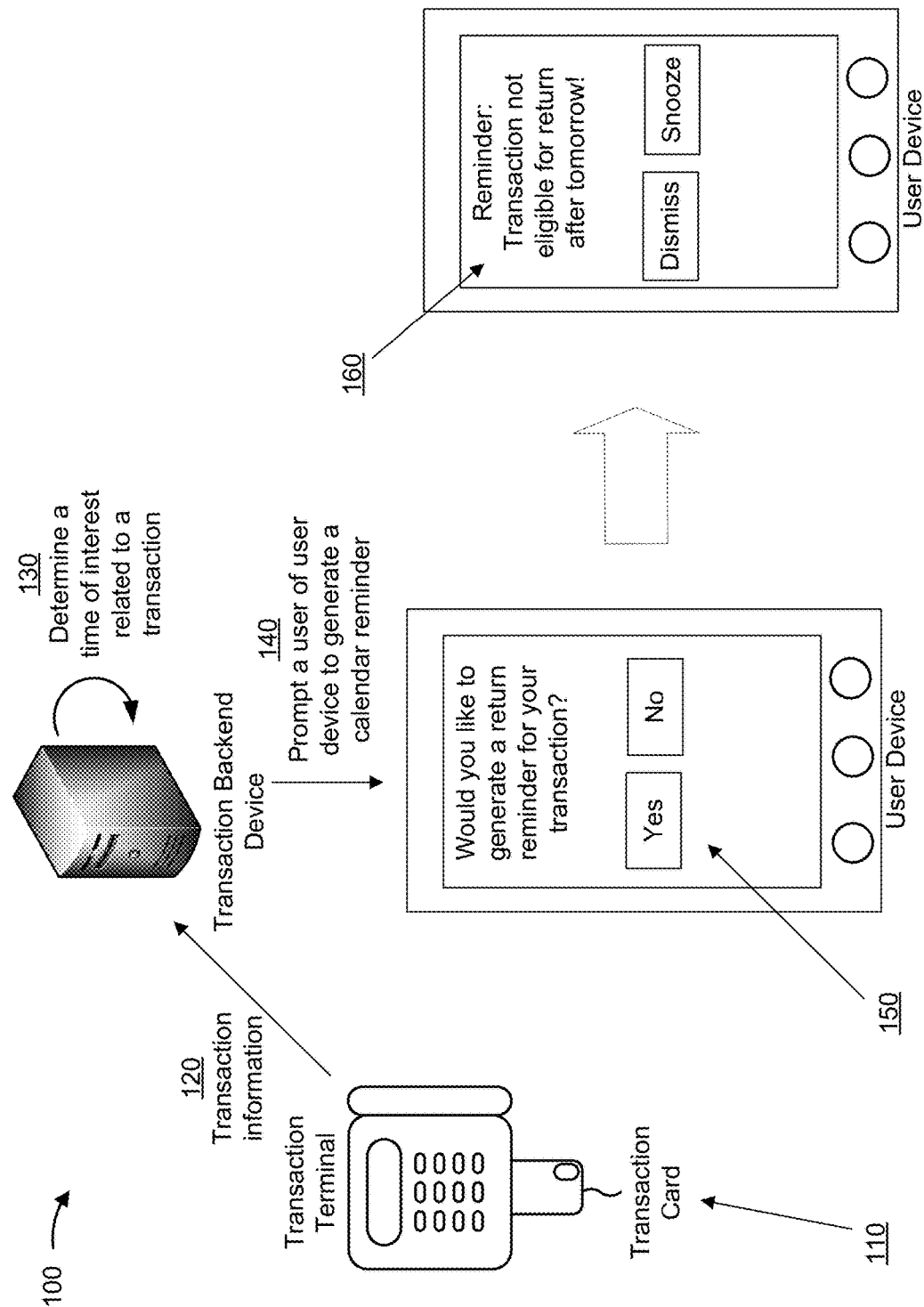
FIG. 1 is a diagram of an overview of an example implementation described herein.

FIG. 1 is a diagram of an overview of an example implementation 100 described herein. As shown in FIG. 1, implementation 100 includes a transaction card, a transaction terminal, a transaction backend device, and a user device.

As shown by reference number 110, the transaction card may be communicatively coupled with the transaction terminal to complete a transaction. For example, a chip of the transaction card may be inserted into a chip reader of the transaction terminal, the transaction card may have been swiped along a magnetic strip reader of the transaction terminal, a near-field communication (NFC) component of the transaction card (e.g., an NFC antenna) may have been moved within an electromagnetic field of the transaction terminal and aligned with an NFC component of the transaction terminal generating the electromagnetic field, and/or the like. In some implementations, the user device, or another type of device, may be communicatively coupled with the transaction terminal, as described elsewhere herein. For example, an NFC component of the user device may have been aligned with the NFC component of the transaction terminal (e.g., as part of a mobile payment transaction), an NFC component of a key fob may have been aligned with the NFC component of the transaction terminal, a bar code on a key fob or provided for display via a display associated with the user device may have been scanned by a bar code reader of the transaction terminal, and/or the like.

As shown by reference number 120, the transaction backend device may receive, from the transaction terminal or a merchant/service provider associated with the transaction terminal, transaction information related to the transaction being completed via the transaction terminal. Additionally, or alternatively, the transaction backend device may receive the transaction information, from a server device (not shown), in the form of a message (e.g., an email message, a text message, a push notification, etc.), such as a message that was provided to an electronic wallet associated with the user device, or an application installed on the user device (e.g., an application associated with a merchant, an application associated with a financial institution, etc.). For example, the transaction backend device may receive or access the message from the server device based on a user of the user device opting in to having messages related to an electronic wallet or a particular application forwarded to the transaction backend device, based on the transaction backend device hosting the electronic wallet and/or the application, the transaction backend device accessing a messaging account, and/or the like.

In some implementations, the transaction information may include information that identifies parties associated with the transaction, an item and/or a service being purchased in association with the transaction (e.g., stock keeping unit (SKU) level data), an amount of the transaction, a date and/or time of the transaction, whether any discounts were applied to the transaction, and/or the like. In some implementations, the transaction backend device may receive transaction information for hundreds, thousands, or more transactions, thereby receiving a data set that cannot be processed manually or objectively by a human actor. In some implementations, the transaction backend device may receive the transaction information in real-time or near real-time (e.g., as the transaction is being completed), based on requesting the transaction information (e.g., the transaction backend device may receive basic transaction information to complete the transaction and may later request more detailed transaction information from a server device to use as described herein), according to a schedule, periodically, and/or the like.

In some implementations, the transaction backend device may process the transaction information (e.g., based on receiving the transaction information, based on a user of the user device providing input to cause the transaction backend device to process the transaction information, etc.). For example, the transaction backend device may identify particular identifiers included in the transaction information (e.g., that identify parties associated with the transaction, an item and/or a service associated with the transaction, a time stamp associated with the transaction, etc.). Additionally, or alternatively, and as another example, the transaction backend device may process a message using a text processing technique (e.g., a natural language processing technique, an optical character recognition (OCR) technique, etc.) to identify terms included in the message related to the transaction information. For example, the transaction backend device may identify terms that identify parties associated with the transaction, an amount of the transaction, an item and/or a service associated with the transaction, and/or the like.

In some implementations, the transaction backend device may eliminate some transactions from further processing. For example, based on processing the transaction information in the manner described above, the transaction backend device may eliminate transactions associated with particular party identifiers (e.g., restaurants, fuel stations, etc.), particular types of items and/or services (e.g., fuel, some vehicle servicing activities, such as a car wash, a detailing, and/or the like, food, etc.), and/or the like. For example, these types of transactions may not be typically be eligible for a return, a refund, and/or the like. In this way, the transaction backend device may process transactions that are, for example, likely to be eligible for a return, a refund, and/or the like, rather than processing all transactions associated with an account. This conserves processing resources of the transaction backend device.

In some implementations, the transaction backend device may determine a priority for identifiers included in the transaction information (e.g., different identifiers may be associated with different priorities). For example, the transaction backend device may perform a lookup of the identifiers in a data structure that includes various identifiers and corresponding priorities. As a specific example, the transaction backend device may prioritize higher an identifier for an item and/or a service associated with a transaction relative to an identifier for a location where the transaction was completed. In some implementations, the transaction backend may use a prioritized identifier to identify a time of interest associated with a transaction, as described in more detail below. This facilitates faster identification of a time of interest, when multiple times of interest could apply to a transaction, thereby conserving processing resources related to determining a time of interest.

In some implementations, the transaction backend device may determine a score for a transaction based on the transaction information. For example, the transaction backend device may determine the score based on identifiers included in the transaction information, a value associated with the transaction, and/or the like. In some implementations, the transaction backend device may determine the score based on a combination of identifiers included in the transaction information. For example, the transaction backend device may determine individual scores for identifiers included in the transaction information (e.g., a first score for a party associated with the transaction, a second score for an item and/or a service associated with the transaction, etc.) and may determine a total score based on the individual scores (e.g., a weighted score, an average score, a result of a function applied to the individual scores, etc.). Continuing with the previous example, the transaction backend device may perform a lookup of various identifiers and/or priorities associated with the identifiers in a data structure and may identify corresponding scores for the identifiers and/or the priorities.

Additionally, or alternatively, the transaction backend device may use machine learning to determine the score. For example, a machine learning model may have been trained on a training data set that includes combinations of identifiers included in different transaction information and corresponding scores for the different transaction information. In this case, the transaction backend device may process the transaction information using the machine learning model to determine the score. In some implementations, the transaction backend device may use the score to determine a time of interest for a transaction, as described in more detail elsewhere herein. Additionally, or alternatively, the transaction backend device may use the score to determine whether to determine a time of interest for a transaction. For example, an item that is typically not eligible for a refund, such as fuel, that is below a threshold dollar amount, such as a pack of gum, that was purchased at a particular location, such as an item purchased out-of-state, and/or the like may be associated with a score below a predetermined threshold, and the transaction backend device may not determine a time of interest for the item based on the score being below the threshold. This facilitates dynamic identification of a time of interest based on various factors related to a transaction. For example, if an individual purchases many items at the same time, the transaction backend device may identify different times of interest for the items purchased. When the transaction backend device performs these functions for thousands, millions, or more transactions for thousands, millions, or more individuals, the transaction backend device may process billions of data elements.

As shown by reference number 130, the transaction backend device may determine a time of interest related to a transaction (e.g., automatically after receiving and/or processing the transaction information, based on receiving input from a user of the user device to determine the time of interest, based on determining that the time of interest is to be calculated, etc.). For example, a time of interest may include a deadline for returning an item associated with the transaction, a deadline for obtaining a refund for an item and/or a service associated with the transaction, an expiration date related to the item and/or the service, a deadline for obtaining store credit for a refund of the item and/or the service, and/or the like.

In some implementations, the transaction backend device may determine a time of interest by performing a lookup of the transaction information. For example, the transaction backend device may perform a lookup of one or more identifiers included in the transaction information and may determine a time of interest based on a result of the lookup indicating a match. As a specific example, the transaction backend device may perform a first lookup of a first identifier that identifies a merchant associated with the transaction to identify a set of times of interest associated with the merchant, and may perform a second lookup of a second identifier that identifies an item and/or a service purchased from the merchant to determine a corresponding time of interest for the transaction. In this way, the transaction backend device can determine times of interest for the same item and/or service across multiple organizations.

In some implementations, the transaction backend device may generate a data structure of information used to perform a lookup of one or more identifiers and/or may obtain the information used to perform the lookup. For example, the transaction backend device can use an application programming interface (API) to a server device associated with a merchant to obtain return policy data for the merchant and may populate a data structure with the return policy data (e.g., in real-time, on an as-needed basis, periodically to update the data structure, etc.). As a specific example, the transaction backend device may request all return policy data for a merchant via the API. Additionally, or alternatively, and as another specific example, the transaction backend device may request policy data for a specific item and/or service associated with the merchant, for a particular type of customer (e.g., a preferred customer, a non-preferred customer, etc.), and/or the like by providing, to the server device, an identifier included in the transaction information. In some implementations, the transaction backend device may store the data structure after the first time the policy data is requested, thereby conserving processing resources associated with re-requesting the policy data. Additionally, or alternatively, the transaction backend device may delete the data structure after determining a time of interest using the data structure, thereby conserving memory resources associated with storing the data structure. In some implementations, the data structure may be aggregated with another data structure (e.g., policy data for a first merchant may be aggregated with policy data for a second merchant). This facilitates dynamic modification of times of interest for a first merchant based on times of interest for a second merchant (e.g., to account for trends in times of interest, patterns in times of interest, etc.).

In some implementations, the transaction backend device may use a bot and/or a script to obtain policy related data from a merchant. For example, the transaction backend device may use a bot and/or a script to crawl a merchant's website to identify links to a return policy, to identify terms and/or phrases on a webpage related to a return policy, and/or the like. In some implementations, the transaction backend device may process information related to a receipt to identify information related to a policy of a merchant. For example, the transaction backend device may process an electronic message (e.g., an email, a push notification, etc.) for information related to a policy (e.g., using a natural language processing technique to identify terms and/or phrases included in the electronic message related to the merchant's policy). Additionally, or alternatively, and as another example, a user of the user device may scan and upload an image of a paper receipt to the transaction backend device and the transaction backend device may process the image of the receipt using an optical character recognition (OCR) technique, a computer vision technique, and/or the like to identify information in the image related to a policy of a merchant. In this way, the transaction backend device can identify information related to a merchant that does not provide policy-related information via a web site or another electronic source accessible by the transaction backend device. In some implementations, the transaction backend device may populate a data structure with the policy-related information and may use the policy related information to determine a time of interest, as described elsewhere herein.

In some implementations, the transaction backend device may use the information in the data structure to provide a pre-purchase notification (e.g., prior to a transaction being completed) via the user device. For example, the notification may include information that identifies a time of interest for the transaction, variations in times of interest across merchants (e.g., whether the merchant offers free returns, whether the merchant charges a re-stocking fee for a return, whether a competitor merchant offers a longer period for a return, etc.), variations in processes across merchants (e.g., whether a merchant provides a pre-printed return label, whether the merchant permits in-store return of an item purchased online, etc.), and/or the like. Additionally, or alternatively, the transaction backend device may use the information in the data structure to generate a calendar reminder for a time of interest (e.g., by using the information to determine a date and/or a time for the calendar reminder).

Additionally, or alternatively, the transaction backend device may determine the time of interest based on a type of the transaction (e.g., a retail transaction, a fuel transaction, a food transaction, etc.). For example, the transaction backend device may determine the type of the transaction based on identifiers included in the transaction information (e.g., based on an identifier identifying the type of the transaction, based on classifying a merchant, an item, and/or a service as a particular type of merchant, item, and/or service, such as a retail merchant, a retail item, and/or a retail service, etc.). As specific examples, the transaction backend device may determine a deadline for obtaining a refund for a retail transaction based on the transaction being a retail transaction (e.g., may determine a default deadline, an average deadline across items, services, and/or merchants, etc.), may determine that a food transaction at a restaurant is not eligible for a refund based on the transaction being a food transaction at a restaurant, and/or the like. In this way, the transaction backend device may classify a transaction and may quickly determine a time of interest associated with the transaction based on classifying the transaction, thereby conserving processing resources associated with determining a time of interest.

Additionally, or alternatively, the transaction backend device may determine a time of interest based on a score associated with a transaction (e.g., a score similar to that described elsewhere herein). For example, the transaction backend device may determine a time of interest based on the score satisfying a threshold, based on the score being within a range of scores, based on a result of performing a lookup of the score in a data structure that includes information identifying scores and corresponding times of interest, and/or the like. As a specific example, the transaction backend device may have determined a score for a transaction based on corresponding transaction information including values for various factors, such as a particular merchant identifier, a particular item and/or service identifier, a particular account identifier (e.g., for an account associated with a customer), an amount of the transaction, and/or the like, and may determine a time of interest based on the score. In some implementations, the transaction backend device may determine individual scores for various factors and may determine an overall score for a transaction based on the individual scores (e.g., the overall score may be an average of the individual scores, a result of a function applied to the individual scores, a weighted score where the individual scores, or factors, have different weights, etc.).

As a specific example, assume that transaction information for a transaction includes a particular merchant identifier, an identifier for a preferred customer, and an amount for the transaction. Further assume, for example, that the identifier for the preferred customer is weighted more heavily than the amount of the transaction, which is weighted more heavily than the particular merchant identifier. In this case, the transaction backend device may determine a score for the transaction based on the weightings for these factors (e.g., by weighting individual scores for the factors and determining an overall score) and may identify a time of interest (e.g., a return deadline) based on the score (e.g., different scores may be associated with different return deadlines). If, for example, the same transaction was associated with a non-preferred customer, the transaction backend device may determine a different score based on different weightings for the factors (e.g., the amount may be weighted more than the merchant identifier, which may be weighted more than a non-preferred customer identifier). Continuing with the previous example, the transaction backend device may determine a different return deadline for the transaction based on the different score.

In this way, the transaction backend device may dynamically determine a time of interest in a manner that accounts for different factors related to a transaction, such as whether a customer is a preferred customer (e.g., which may be associated with a longer amount of time to return an item and/or to obtain a refund for the item), a value of a transaction (e.g., where a threshold value is associated with a longer than default time to return an item and/or to obtain a refund), whether the item is a final sale item for which returns are not allowed (e.g., as determined based on information processed from a receipt in a manner similar to that described elsewhere herein, based on an API call using an identifier that identifies a transaction associated with the item, etc.), and/or the like. This improves customer service provided by an organization by facilitating dynamic determination of a time of interest. In addition, this facilitates implementation of a dynamic return policy across a large quantity of transactions and/or customers in a manner not previously possible.

Additionally, or alternatively, the transaction backend device may determine a time of interest based on a priority for different identifiers included in the transaction information. For example, different identifiers may be associated with different times of interest, and the transaction backend device may determine the time of interest based on an identifier with the highest priority relative to other priorities for other identifiers (e.g., based on a result of performing a lookup of the identifier in a data structure that includes identifiers and corresponding times of interest).

As a specific example, the transaction backend device may have determined that an identifier for an item and/or a service associated with the transaction has the highest priority relative to other identifiers (e.g., for a merchant, a location, an account, and/or the like associated with the transaction) and may determine the time of interest associated with the identifier for the item and/or the service. In this way, the transaction backend device facilitates dynamic prioritization of different factors related to a transaction so that an organization can provide longer amounts of time for returns and/or refunds, for example, to preferred customers, for preferred types of transactions, and/or the like.

Additionally, or alternatively, the transaction backend device may determine a time of interest based on a combination of identifiers included in the transaction information and/or other information related to other transactions (e.g., associated with the same parties, the same item and/or service, etc.). For example, different combinations of identifiers included in the transaction information may be associated with different times of interest. As a specific example, the transaction backend device may determine a deadline for a return for a first transaction based on the first transaction being associated with a preferred customer, whereas the transaction backend device may determine a different deadline for a return for a second transaction based on the second transaction being associated with a non-preferred customer, despite being associated with the same item and/or service as the first transaction and being associated with the same merchant.

Additionally, or alternatively, the transaction backend device may determine a time of interest based on using a machine learning model to process the combination of identifiers included in the transaction information. For example, the machine learning model may have been trained on a training set of data that includes transaction information with different combinations of identifiers and corresponding times of interest. In this case, the transaction backend device may use the machine learning model to determine a time of interest for a transaction based on the combination of identifiers included in transaction information associated with the transaction. For example, the machine learning model may determine different times of interest for different combinations of identifiers included in the transaction information, may determine the same time of interest for different transactions where corresponding transaction information for the different transactions includes the same identifier (e.g., an identifier that has the highest priority relative to other identifiers), may determine the same time of interest for different transactions where transaction information corresponding to the different transactions includes a threshold quantity or percentage of the same identifiers, and/or the like.

In some implementations, the transaction backend device may modify a time of interest from a default time of interest based on other information related to other transactions. For example, the transaction backend device may monitor, using an analytics model, a trend, a pattern, and/or the like associated with returns and/or refunds for other transactions for an item and/or a service, and may modify a default time of interest for a transaction based on the trend, the pattern, and/or the like. As a specific example, the analytics model may identify a trend of individuals attempting to return an item an average of five days after the deadline for returning the item, and may determine a deadline for a transaction for the same item by increasing a default deadline by five days when determining the time of interest for the transaction. Additionally, or alternatively, and continuing with the previous example, if the transaction backend device identifies a trend of individuals returning an item, the transaction backend device may send a message to a server device associated with a merchant to notify the merchant of the trend, to notify a store employee (e.g., by sending a message to a user device) and/or a robot to remove the item from shelves of the store, and/or the like.

Additionally, or alternatively, the transaction backend device may augment functions of the transaction backend device based on information related to a trend. For example, the transaction backend device may determine that a threshold percentage of purchasers of a particular item and/or from a particular merchant set a calendar reminder for a return of the item and/or to the particular merchant and may weight this factor more heavily relative to other factors when determining whether to prompt another purchaser of the same item and/or from the particular merchant to generate a calendar reminder. Conversely, and as another example, the transaction backend device may determine that a threshold percentage of purchasers of a particular item and/or from a particular merchant do not set a calendar reminder for a return of the item and/or to the particular merchant and may weight this factor more heavily relative to other factors when determining whether to prompt another purchaser of the same item and/or from the particular merchant to generate a calendar reminder. Additionally, or alternatively, as another example, the transaction backend device may determine that a threshold percentage of purchasers of an item and/or from a particular merchant return the item and/or make a return to the particular merchant on a particular day relative to a return deadline (e.g., the same day as the return deadline, a week before the return deadline, a day after the return deadline, etc.) and may determine a time of interest for the item and/or a purchase from the particular merchant based on this trend (e.g., may determine to generate multiple calendar reminders, may determine to generate a calendar reminder for one week prior to a return deadline, etc.).

In some implementations, the transaction backend device may identify a trend related to returns of an item across multiple merchants and may aggregate trend-related data for the multiple merchants. In some implementations, the transaction backend device may use trend-related data for a first merchant to modify a default time of interest for a second merchant (e.g., a default return deadline). Additionally, or alternatively, the transaction backend device may use trend-related data for a first merchant to notify a second merchant of the trend (e.g., in situations where the second merchant has not received a threshold quantity of returns to be able to identify the trend), such as by sending a message to a server device associated with the second merchant, to a user device associated with an employee of the second merchant, and/or the like. Additionally, or alternatively, the transaction backend device may notify a customer of the trend (e.g., via a user device associated with the customer) and/or may determine a time of interest for a transaction associated with the customer based on the trend (e.g., may modify a default time of interest based on the trend).

In some implementations, the transaction backend device may determine a time of interest based on an amount of time predicted for a credit for a return to be applied to an account. For example, an analytics model may predict an amount of time for a credit for a return to be applied to an account based on historical information related to an amount of time for a return to be credited for the same merchant, for the same type of item and/or service, a store policy for crediting returns (e.g., a store may hold a credit for a return for seven business days, for a month, for 24 hours, etc., as determined based on information received from a server device associated with the store via an application programming interface (API)), and/or the like. In this case, for example, the transaction backend device may determine a return deadline so that an account to which the return is to be credited will be credited by the end of the month (e.g., so that the money is available to pay bills), within an amount of time from when a transaction was completed, and/or the like.

In some implementations, the transaction backend device may determine a time of interest based on a store policy for a price comparison deadline (e.g., based on information related to the store policy received from a server device associated with store via an API). For example, a store may offer a rebate if a competitor's price is lower within an amount of time of a transaction (e.g., 30 days, 90 days, one week, etc.) and the transaction backend device may determine a time of interest based on this information. Continuing with the previous example, if an item is associated with a 30 day rebate deadline and a 90 day return deadline, the transaction backend device may determine a first time of interest for the rebate policy and a second time of interest for the return policy.

As shown by reference number 140, the transaction backend device may prompt a user of the user device to generate a calendar reminder (e.g., a notification provided for display that includes information identifying a time of interest, a calendar event that is populated on an electronic calendar at specific day and/or time, etc.). For example, the prompt may be associated with generating a calendar reminder, on an electronic calendar associated with an account of a user of the user device, for the time of interest associated with the transaction. For example, and as shown by reference number 150, the transaction backend device may cause the user device to provide a user interface for display via a display associated with the user device to prompt the user. Continuing with the previous example, the user interface may include various user interface elements (e.g., buttons, toggles, etc.) that the user can use to cause the calendar reminder to be generated. Additionally, or alternatively, and as other examples, the transaction backend device may cause the user device to output sensory output (e.g., a sound, light, a vibration, etc.) to prompt the user.

In some implementations, the user device may generate the calendar reminder based on selection of one or more user interface elements associated with the user interface. For example, the user device may provide, to a server device (not shown) that hosts an account associated with user, an instruction to generate the calendar reminder on an electronic calendar associated with the account.

In some implementations, the user device and/or the server device may identify a day and/or time for the calendar reminder. For example, the user device and/or the server device may analyze other events on the same day as a deadline for returning an item for a refund and may select the same day or another day for the calendar reminder (e.g., by processing calendar reminders, calendar events, and/or the like on the electronic calendar). Continuing with the previous example, if a threshold quantity of other events are scheduled for the same day as the deadline for returning the item (or if events are scheduled for a threshold quantity of hours of a day, a threshold quantity of business hours of a day, etc.), if other events scheduled for the same day are associated with a threshold importance (e.g., a mandatory attendance requirement, a high importance, etc. as determined by information included in other calendar events or calendar reminders), and/or the like, the user device and/or the server device may identify another day (e.g., a prior day) for the calendar reminder.

Additionally, or alternatively, and as another example, the server device and/or the user device may identify a day for the calendar reminder based on a preference of a user associated with the electronic calendar and/or based on a default preference. For example, the server device and/or the user device may identify a weekend day prior to a deadline for returning an item as the day for the calendar reminder.

As shown by reference number 160, the user device may provide, for display via a display associated with the user device, a user interface associated with the calendar reminder on the day and/or time associated with the calendar reminder. For example, the user device may provide the user interface for display based on a set of instructions from the server device, based on detecting that a current time stamp matches the time and/or day for the calendar reminder, and/or the like.

In some implementations, the user interface may include one or more user interface elements. For example, the one or more user interface elements may be associated with causing the calendar reminder to be dismissed, to be snoozed, and/or the like. Additionally, or alternatively, as other examples, selection of the one or more user interface elements may cause the user device to open a navigation application and generate directions to a location associated with the transaction (e.g., a merchant location), to populate a return form (e.g., in an application associated with a merchant or an electronic wallet) associated with returning an item and/or a service associated with the transaction, to cause an autonomous vehicle to navigate to a store, to cause a drone (e.g., of a merchant or of a user) to deploy to return an item to the merchant, and/or the like.

In this way, a transaction backend device may manage times of interest for many transactions on behalf of individuals associated with the transactions. In addition, in this way, a transaction backend device can push time of interest-related information to a user device, thereby providing a centralized device capable of managing complex and changing return policies. This reduces or eliminates inadvertently missed times of interest, thereby improving customer satisfaction of customers associated with an organization. In addition, this provides a way for managing times of interest in a manner not possible by a human actor, thereby improving management of the times of interest. Further, this provides an individual with quick and easy access to information identifying times of interest associated with transactions associated with the individual, thereby conserving processing resources that would otherwise be consumed via less efficient access to the times of interest.

As indicated above, FIG. 1 is provided merely as an example. Other examples are possible and may differ from what was described with regard to FIG. 1. For example, although some implementations were described with regard to a single transaction, the transaction backend device may perform the implementations described herein for thousands, millions, or more transactions. As another example, the user device may perform the implementations described herein for hundreds, thousands, or more transactions associated with an electronic wallet, an application (e.g., associated with a merchant or a financial institution), and/or the like.

Figure 2:
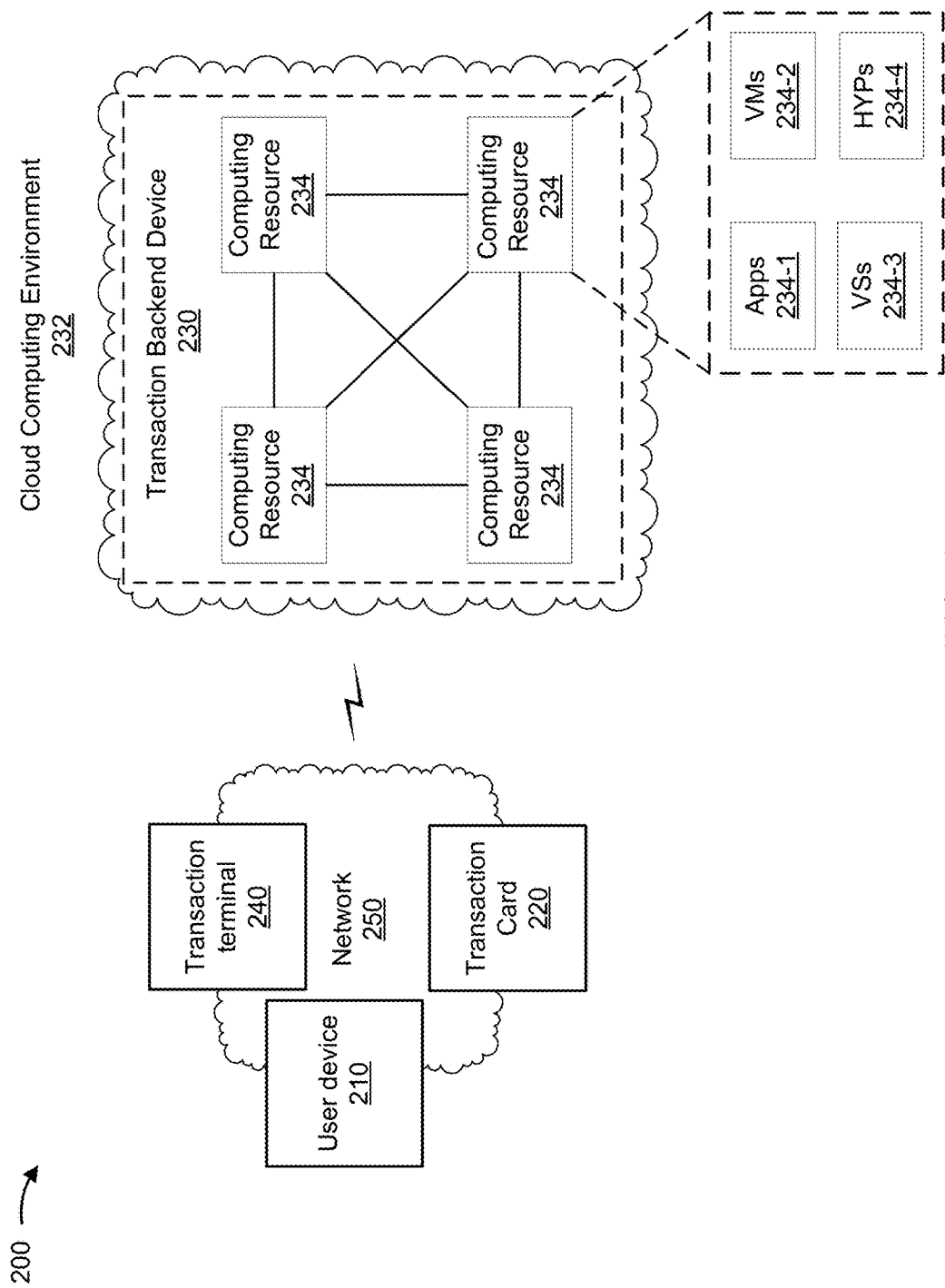
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction backend device 230 in a cloud computing environment 232 that includes a set of computing resources 234, a transaction terminal 240, and/or a network 250. Devices of environment 200 may interconnect via wired connections, wireless connections, or a combination of wired and wireless connections.

User device 210 includes one or more devices capable of receiving, generating, storing, processing, and/or providing transaction information associated with a transaction. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), a remote computing device (e.g., remote from transaction backend device 230), or a similar type of device. In some implementations, user device 210 may provide, for display via a display associated with user device 210, a user interface associated with generating a calendar reminder for a time of interest associated with a transaction, as described elsewhere herein. In some implementations, user device 210 may include an electronic wallet or another type of transaction application to facilitate use of a transaction mechanism via the electronic wallet or the other type of application.

Transaction card 220 includes a transaction card that can be used to complete a transaction. For example, transaction card 220 may include a credit card, a debit card, a gift card, a payment card, an automated teller machine (ATM) card, a stored-value card, a fleet card, a transit card, an access card, a virtual card implemented on user device 210, and/or the like. Transaction card 220 may be capable of storing and/or communicating data for a point-of-sale (PoS) transaction with transaction terminal 240. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip). In some implementations, transaction card 220 may provide, to transaction terminal 240, information to be used to complete a transaction, as described elsewhere herein.

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may communicate with transaction terminal 240 to complete a transaction (e.g., based on being moved within communicative proximity of transaction terminal 240), as described elsewhere herein.

Transaction backend device 230 includes one or more devices capable of authorizing and/or facilitating a transaction. For example, transaction backend device 230 may include one or more servers and/or computers to store and/or provide information associated with processing a transaction via transaction terminal 240. In some implementations, transaction backend device 230 may process information from transaction card 220 to complete a transaction, as described elsewhere herein. Additionally, or alternatively, transaction backend device 230 may identify a time of interest associated with a transaction based on transaction information associated with the transaction, as described elsewhere herein.

Transaction backend device 230 may include one or more devices associated with a financial institution (e.g., a bank, a lender, a credit union, etc.) and/or a transaction card association that authorizes a transaction and/or facilitates a transfer of funds or payment between an account associated with a cardholder of transaction card 220 and an account of an individual or business associated with transaction terminal 240. For example, transaction backend device 230 may include one or more devices of one or more issuing banks associated with a cardholder of transaction card 220, one or more devices of one or more acquiring banks (or merchant banks) associated with transaction terminal 240, and/or one or more devices associated with one or more transaction card associations (e.g., VISA®, MASTERCARD®, and/or the like) associated with transaction card 220. Accordingly, based on receiving information associated with transaction card 220 from transaction terminal 240, devices of transaction backend device 230 (e.g., associated with a financial institution or transaction card association) may communicate to authorize a transaction and/or transfer funds between the accounts associated with transaction card 220 and/or transaction terminal 240.

Transaction backend device 230 may provide or deny authorization associated with a transaction. For example, transaction backend device 230 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with transaction card 220 and/or provided by transaction terminal 240.

Transaction backend device 230 may include one or more devices associated with a rewards program associated with transaction card 220 and/or an entity (e.g., a financial institution, a merchant, a service provider, a vendor, and/or the like) associated with transaction card 220 and/or transaction terminal 240. For example, transaction backend device 230 may authorize the earning and/or redemption of rewards (e.g., rewards points associated with transaction card 220, cash rewards, client loyalty rewards associated with an entity associated with transaction terminal 240, and/or the like) based on a transaction processed by transaction terminal 240. In some implementations, transaction backend device 230 may determine a time of interest for a transaction, as described elsewhere herein.

In some implementations, as shown in FIG. 2, transaction backend device 230 may be hosted in cloud computing environment 232. Notably, while implementations described herein describe transaction backend device 230 as being hosted in cloud computing environment 232, in some implementations, transaction backend device 230 may not be cloud-based (i.e., may be implemented outside of a cloud computing environment) or may be partially cloud-based.

Cloud computing environment 232 includes an environment that hosts transaction backend device 230. Cloud computing environment 232 may provide computation, software, data access, storage, and/or other services that do not require end-user knowledge of a physical location and configuration of a system and/or a device that hosts transaction backend device 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host transaction backend device 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with transaction backend device 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Transaction terminal 240 includes one or more devices capable of facilitating processing of a transaction associated with transaction card 220. For example, transaction terminal 240 may include a point-of-sale (PoS) terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 240 may communicate with transaction backend device 230 to provide, to transaction backend device 230, information related to a transaction for which transaction card 220 is being used, as described elsewhere herein.

In some implementations, transaction terminal 240 may include one or more input components and/or output components to facilitate obtaining information from transaction card 220 (e.g., an account number of an account associated with transaction card 220, an expiration date of transaction card 220, etc.), input (e.g., a personal identification number (PIN), a signature, biometric information, etc.), from a cardholder of transaction card 220, related to completing and/or authorizing a transaction, and/or the like. In some implementations, example input components of transaction terminal 240 may include a number keypad, a touchscreen, a magnetic strip reader, a chip reader, a pen and corresponding signature pad, an RF signal reader, and/or the like.

In some implementations, a magnetic strip reader of transaction terminal 240 may receive data from transaction card 220 as a magnetic strip of transaction card 220 is swiped along the magnetic strip reader. In some implementations, a chip reader of transaction terminal 240 may receive data from transaction card 220 via an integrated circuit chip (e.g., an EMV chip) of transaction card 220 when the chip is placed within communicative proximity of the chip reader. In some implementations, an RF signal reader of transaction terminal 240 may enable a contactless transaction from transaction card 220 and/or user device 210 by obtaining data wirelessly from transaction card 220 and/or user device 210 as transaction card 220 and/or user device 210 comes within communicative proximity of transaction terminal 240, such that the RF signal reader detects an RF signal from an RF antenna of transaction card 220 and/or user device 210.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

Network 250 includes one or more wired and/or wireless networks. For example, network 250 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
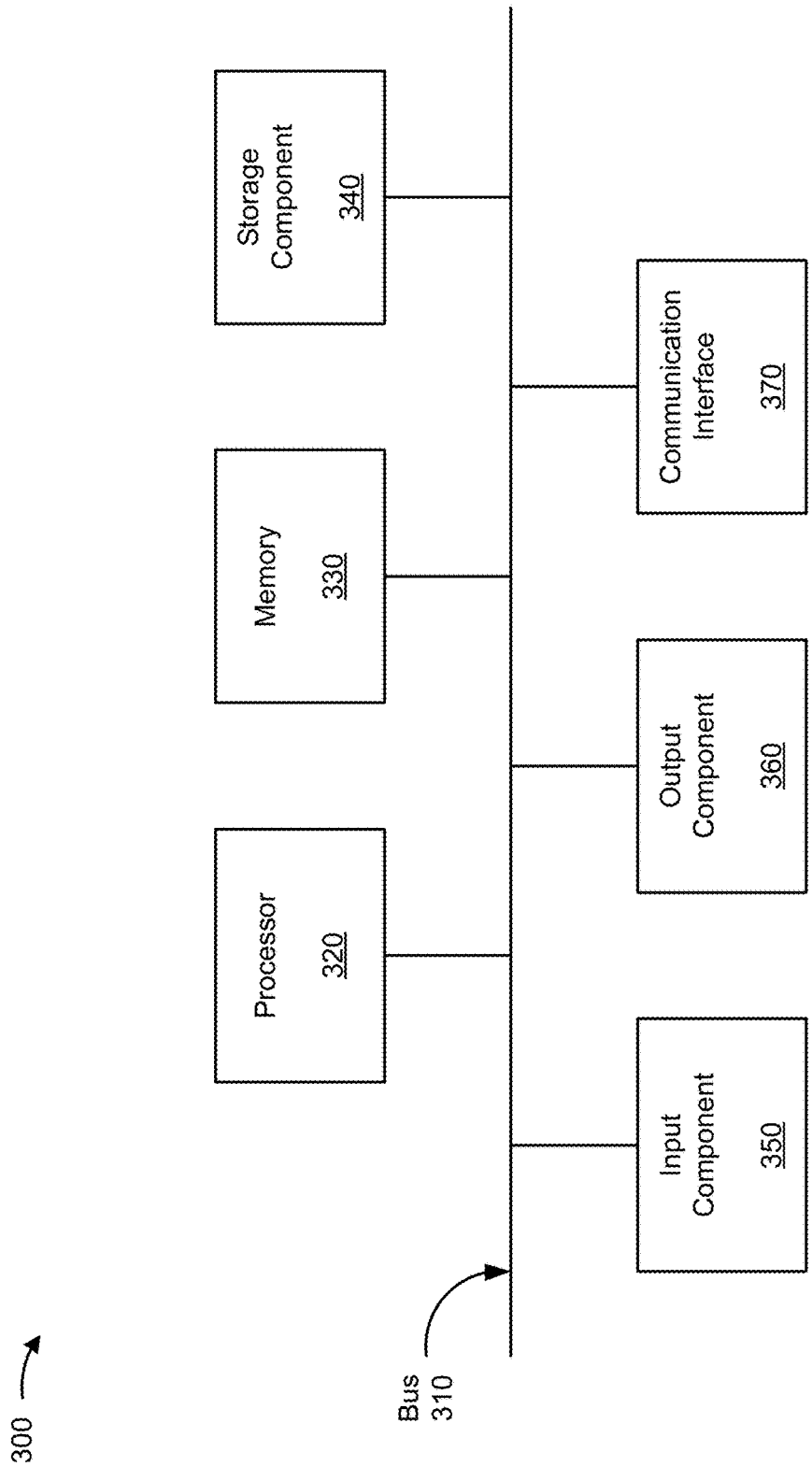
FIG. 3 is a diagram of example components of one or more devices of FIG. 2.

FIG. 3 is a diagram of example components of a device 300. Device 300 may correspond to user device 210, transaction card 220, transaction backend device 230, computing resource 234, and/or transaction terminal 240. In some implementations, user device 210, transaction card 220, transaction backend device 230, computing resource 234, and/or transaction terminal 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
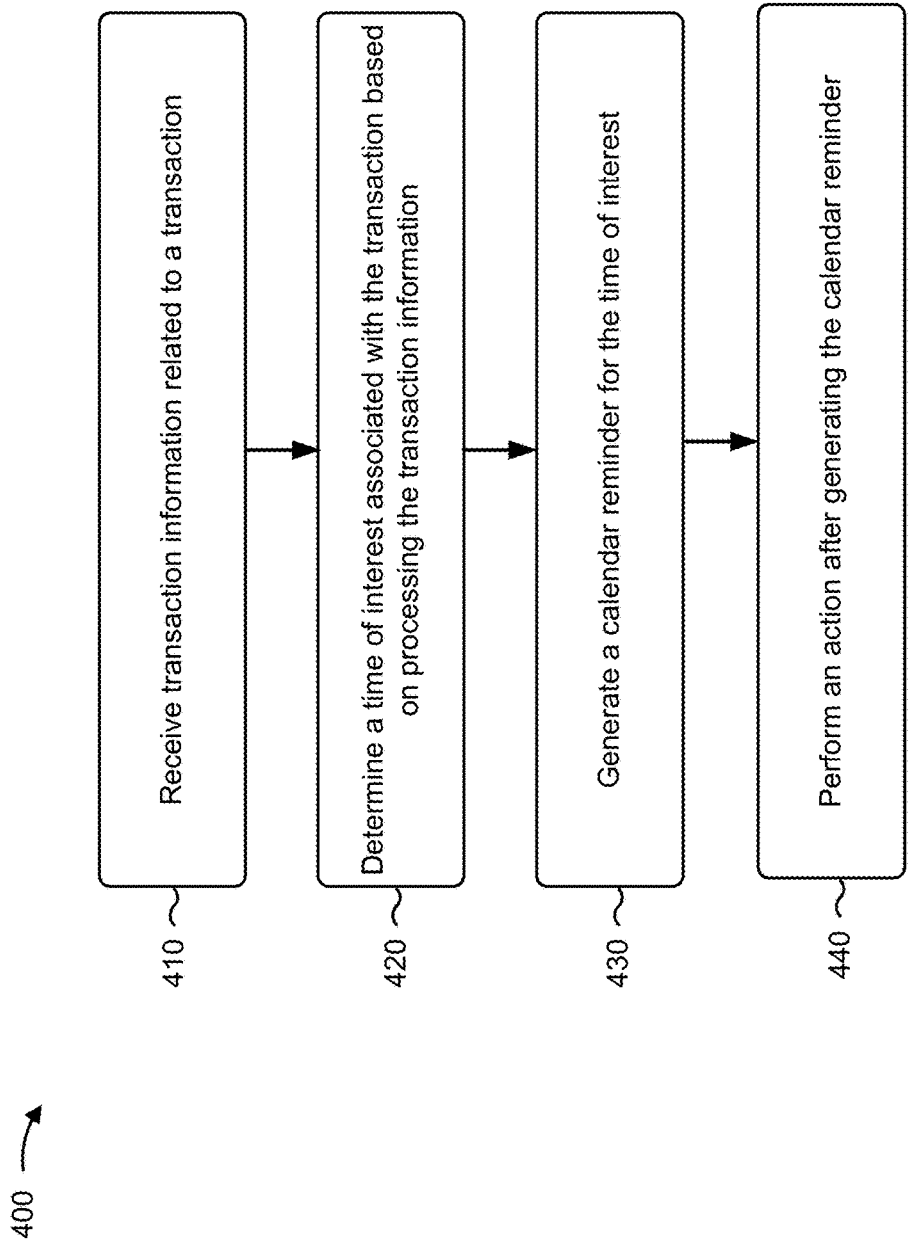
FIG. 4 is a flow chart of an example process for parsing transaction information for extraction and/or organization of transaction-related information.

FIG. 4 is a flow chart of an example process 400 for parsing transaction information for extraction and/or organization of transaction-related information. In some implementations, one or more process blocks of FIG. 4 may be performed by a device (e.g., a user device, such as user device 210 and/or a transaction backend device, such as transaction backend device 230). In some implementations, one or more process blocks of FIG. 4 may be performed by another device or a group of devices separate from or including the device, such as a transaction card (e.g., transaction card 220) or a transaction terminal (e.g., transaction terminal 240).

As shown in FIG. 4, process 400 may include receiving transaction information related to a transaction (block 410). For example, the device (e.g., user device 210 and/or transaction backend device 230) may receive transaction information related to a transaction (e.g., in association with the transaction being completed). In some implementations, the device may receive transaction information related to a transaction in a manner that is the same or similar to that described above with respect to FIG. 1. For example, the device may receive the transaction information in association with a transaction being completed.

As further shown in FIG. 4, process 400 may include determining a time of interest associated with the transaction based on processing the transaction information (block 420). For example, the device may determine a time of interest associated with the transaction based on processing the transaction information (e.g., after processing the transaction information to identify a set of identifiers included in the transaction information and/or based on the set of identifiers included in the transaction information). In some implementations, the device may determine a time of interest associated with the transaction based on processing the transaction information in a manner that is the same or similar to that described above with respect to FIG. 1. For example, the device may determine the time of interest based on one or more identifiers included in the transaction information.

As further shown in FIG. 4, process 400 may include generating a calendar reminder for the time of interest (block 430). For example, the device may generate a calendar reminder for the time of interest. In some implementations, the device may generate a calendar reminder for the time of interest in a manner that is the same or similar to that described above with respect to FIG. 1. For example, the device may generate a calendar reminder on an electronic calendar for the time of interest.

As further shown in FIG. 4, process 400 may include performing an action after generating the calendar reminder (block 440). For example, the device may perform an action after generating the calendar reminder. In some implementations, the device may perform an action after generating the calendar reminder in a manner that is the same or similar to that described with respect to FIG. 1. For example, the device may provide a notification for display that includes information that identifies the time of interest.

Process 400 may include additional implementations, such as any single implementation or any combination of implementations described below.

In some implementations, a set of identifiers included in the transaction information may include at least one of a first identifier that identifies a third party associated with the transaction, a second identifier that identifies a type of the transaction, or a third identifier that identifies an account that was used to complete the transaction. In some implementations, the time of interest may include at least on of an expiration date of an item associated with the transaction, a deadline for obtaining a refund for the item and/or a service associated with the transaction, a deadline for returning the item associated with the transaction, and/or a deadline for obtaining store credit for the refund of the item and/or the service. In some implementations, the device may determine, after processing the transaction information, at least one of a priority for a set of identifiers included in the transaction information, and/or a score for the set of identifiers.

In some implementations, the device may determine a priority for different identifiers included in a set of identifiers included in the transaction information after identifying the set of identifiers and may determine the time of interest based on the priority for the different identifiers after determining the priority (e.g., where an identifier, of the set of identifiers, is associated with a higher priority relative to other priorities for other identifiers of the set of identifiers). In some implementations, the device may determine different priorities for different combinations of identifiers for different transactions, and may determine different times of interest for the different transactions based on the different priorities for the different combinations of identifiers.

In some implementations, the device may determine a first time of interest for a first transaction based on a first combination of identifiers associated with the first transaction, and may determine a second time of interest for a second transaction based on a second combination of identifiers associated with the second transaction (e.g., where the first time of interest and the second time of interest are different, where the first combination of identifiers and the second combination of identifiers are different, and/or where the first transaction and the second transaction are associated with a same type of transaction). In some implementations, the device may determine different times of interest for a same type of transaction based on different combinations of identifiers.

In some implementations, the device may determine a score for the transaction based on a set of identifiers included in the transaction information after processing the transaction information, and may determine the time of interest based on the score. In some implementations, the device may determine a first time of interest for a first transaction based on a first score for a first set of identifiers included in first transaction information for the first transaction, and may determine a second time of interest for a second transaction based on a second score for a second set of identifiers included in second transaction information for the second transaction (e.g., where the first time of interest and the second time of interest are different, where the first set of identifiers and the second set of identifiers are different, and/or where the first transaction and the second transaction are a same type of transaction). In some implementations, the device may determine different scores for different combinations of identifiers after receiving the transaction information, and may determine different times of interest for the different combinations of identifiers based on the different scores for the different combinations of identifiers.

In some implementations, the device may detect a location of the device based on location information from a sensor associated with the device, may identify a match between a third party location, identified in the transaction information and associated with a third party associated with the transaction, and the location of the device after detecting the location, and may determine the time of interest after identifying the match between the third party location and the location of the device. In some implementations, the device may prompt, via a user interface provided for display via a display associated with the device, a user for input of a third party identifier associated with the transaction after receiving the transaction information, may determine a match between the third party identifier with an identifier, of a set of identifiers, included in the transaction information based on the input, and may determine the time of interest after determining the match between the third party identifier and the identifier.

In some implementations, the device may process a push notification received by the device via an electronic wallet associated with the device (e.g., where the push notification includes the transaction information), and may determine the time of interest based on a result of processing the push notification. In some implementations, the device may determine the time of interest from an electronic message associated with an electronic wallet.

In some implementations, the device may prompt, via a display associated with the device by providing a user interface for display, a user of the device to indicate whether to generate the calendar reminder prior to generating the calendar reminder, may detect a selection of a user interface element associated with the user interface after prompting the user of the device, and may generate the calendar reminder after detecting the selection of the user interface element. In some implementations, the device may determine, based on a user interaction with one or more user interface elements of the user interface, to generate the calendar reminder, and may generate the calendar reminder after determining to generate the calendar reminder based on the user interaction with the one or more user interface elements.

In some implementations, the device may identify a particular time for the calendar reminder based on at least one of a preference of an account associated with a user of a device, a default preference associated with the account, one or more other calendar reminders associated with the electronic calendar, or a location of the device, and may generate the calendar reminder for the particular time after identifying the particular time. In some implementations, the device may populate an electronic calendar with the calendar reminder after generating the calendar reminder. In some implementations, the device may populate a data structure with information identifying the time of interest, and may output, for display, the information identifying the time of interest in association with the transaction information via an electronic wallet associated with the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
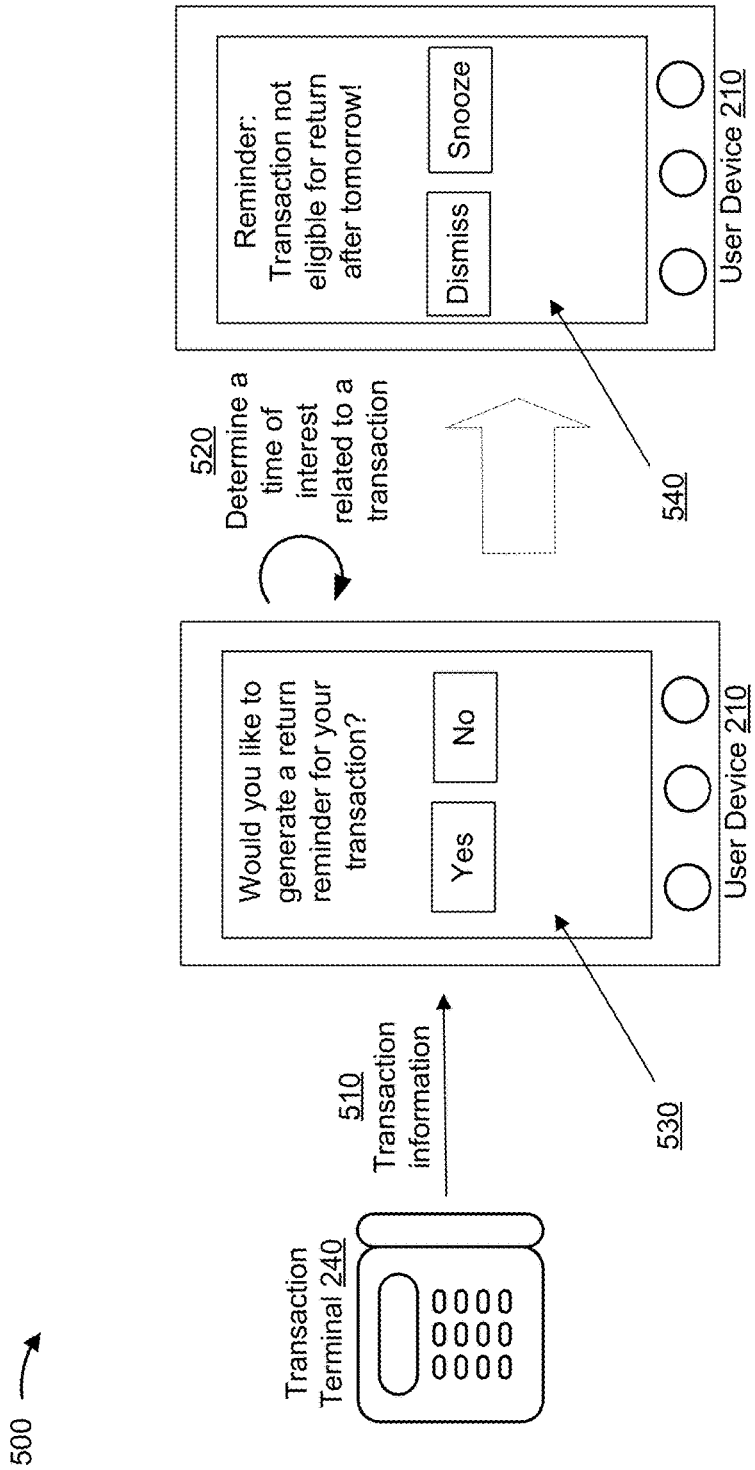
FIG. 5 is a diagram of an example implementation relating to the example process shown in FIG. 4.

FIG. 5 is a diagram of an example implementation 500 related to example process 400 shown in FIG. 4. As shown in FIG. 5, implementation 500 includes user device 210 and transaction terminal 240. FIG. 5 shows an example of user device 210, rather than transaction backend device 230, identifying a time of interest related to a transaction.

As shown by reference number 510, user device 210 may receive transaction information from transaction terminal 240. For example, user device 210 may receive the transaction information when user device 210 is communicatively coupled to transaction terminal 240 (e.g., in association with a mobile payment transaction). As shown by reference number 520, the user device may determine a time of interest related to a transaction. For example, user device 210 may determine a time of interest related to a transaction in a manner similar to that described elsewhere herein. In some implementations, user device 210 may determine a time of interest based on transaction information in an electronic wallet on user device 210, in a push notification provided for display via a display associated with user device 210 (e.g., a push notification related to completing a transaction), a record associated with an application (e.g., an application associated with a merchant or a financial institution), and/or the like.

In some implementations, prior to determining a time of interest, user device 210 may confirm a third party location of the transaction identified in the transaction information so that user device 210 can more accurately identify a time of interest. For example, user device 210 may detect a location of user device 210 based on location information from a sensor (e.g., a GPS component, a navigation application, etc.) associated with user device 210, may identify a match between a third party location, identified in the transaction information and associated with a third party associated with the transaction, and the location of the device after detecting the location. In this case, user device 210 may determine the time of interest after identifying the match between the third party location and the location of user device 210.

In some implementations, user device 210 may identify information that transaction backend device 230 needs to use to determine a time of interest. For example, user device 210 may request, from transaction backend device 230 and via an API, information that identifies the types of information that transaction backend device 230 needs for determining a time of interest. In some implementations, after receiving the information that identifies the types of information that transaction backend device 230 needs, user device 210 may process transaction information for the types of information (e.g., particular identifiers, a location of the transaction, etc.) and/or may request, via a user interface provided for display via user device 210, input of the information that transaction backend device 230 needs. In some implementations, user device 210 may provide the information identified in the transaction information and/or input via the user interface to transaction backend device 230 so that transaction backend device 230 can determine the time of interest. This conserves process resources of user device 210 and/or network resources of network 250 by optimizing information provided to transaction backend device 230. In some implementations, transaction backend device 230 may provide a determined time of interest to user device 210 and user device 210 may generate a calendar reminder for the time of interest.

Additionally, or alternatively, and as another example, user device 210 may prompt, via a user interface provided for display via a display associated with user device 210, a user for input of a third party identifier associated with the transaction after receiving the transaction information, and may determine a match between the third party identifier and an identifier, of a set of identifiers, included in the transaction information based on the input. In this case, user device 210 may determine the time of interest after determining the match between the third party identifier and the identifier. This conserves processing resources of user device 210 by reducing or eliminating inaccurate identification of times of interest, reducing or eliminating a need for user device 210 to determine a time of interest if a location associated with the transaction cannot be confirmed, and/or the like.

In some implementations, user device 210 may populate a data structure with information identifying the time of interest after determining the time of interest. For example, user device 210 may populate a data structure associated with an electronic wallet and/or an application installed on user device 210 (e.g., an application associated with a merchant, a bank account, etc.). In some implementations, user device 210 may output, for display, the information identifying the time of interest in association with the transaction information via the electronic wallet and/or the application associated with user device 210.

As shown by reference number 530, user device 210 may provide, for display, a user interface where selection of one or more user interfaces associated with the user interface cause user device 210 to generate a calendar reminder for the time of interest. In some implementations, user device 210 may populate an electronic calendar with the calendar reminder (e.g., so that the calendar reminder is provided for display with the electronic calendar). As shown by reference number 540, user device 210 may detect that a current day and/or time matches a day and/or time associated with the calendar reminder, and may provide a user interface, associated with the calendar reminder, for display.

As indicated above, FIG. 5 is provided merely as an example. Other examples are possible and may differ from what was described with regard to FIG. 5.

In this way, a device may process transaction information related to a transaction and may dynamically identify a time of interest associated with the transaction. This reduces or eliminates waste of computing resources associated with a user manually interacting with a device to identify the time of interest. In addition, this improves management of times of interest for multiple transactions (e.g., thousands, millions, or more transactions), thereby conserving computing resources associated with managing times of interest. Further, this reduces or eliminates a need for a user of a device to perform a search, using the device, for a time of interest associated with a transaction, thereby conserving processing resources associated with identifying a time of interest.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a cloud device and from a transaction terminal, transaction information related to a transaction,
      the transaction being completed between the transaction terminal and a user device via near-field communication (NFC);
   processing, by the cloud device, the transaction information to identify a set of identifiers included in the transaction information after receiving the transaction information,
      the set of identifiers including at least one of:
         a first identifier that identifies a third party associated with the transaction,
         a second identifier that identifies a type of the transaction, or
         a third identifier that identifies an account that was used to complete the transaction;
   determining, by the cloud device, a score for the transaction based on the set of identifiers included in the transaction information after processing the transaction information;
   determining, by the cloud device, based on the score, and using a machine learning model to process the set of identifiers included in the transaction information, one or more times of interest associated with the transaction,
      the one or more times of interest including at least one of:
         a deadline for obtaining a refund for an item or a service associated with the transaction,
         a deadline for returning the item associated with the transaction, or
         a deadline for obtaining store credit for the refund of the item or the service, and
      different identifiers or different combinations of identifiers included in the set of identifiers being associated with different times of interest;
   prompting, by the cloud device via a display associated with the user device, a user to indicate whether to generate a calendar reminder for the one or more times of interest by providing a user interface for display;
   determining, by the cloud device, a selection of a user interface element associated with the user interface after prompting the user;
   generating, by the cloud device based on determining the selection of the user interface element, the calendar reminder; and
   providing, by the cloud device and for display based on generating the calendar reminder, a push notification including information identifying the one or more times of interest,
      an electronic calendar being populated with the calendar reminder,
         the electronic calendar being associated with the user.

2. The method of claim 1, further comprising:
determining a priority for the different identifiers included in the set of identifiers after identifying the set of identifiers; and
wherein determining the one or more times of interest comprises:
determining the one or more times of interest based on the priority for the different identifiers after determining the priority,
an identifier, of the set of identifiers, being associated with a higher priority relative to other priorities for other identifiers of the set of identifiers.

3. The method of claim 1, wherein determining the one or more times of interest comprises:
determining a first time of interest, of the one or more times of interest, for a first transaction based on a first combination of identifiers associated with the first transaction; and
determining a second time of interest, of the one or more times of interest, for a second transaction based on a second combination of identifiers associated with the second transaction,
the first time of interest and the second time of interest being different,
the first combination of identifiers and the second combination of identifiers being different, and
the first transaction and the second transaction being associated with a same type of transaction.

4. The method of claim 1, wherein the push notification is received by the user device via an electronic wallet associated with the user device; and
wherein the push notification includes the transaction information.

5. The method of claim 1, further comprising:
providing another notification for display after the electronic calendar is populated with the calendar reminder.

6. The method of claim 1, further comprising:
using an application programming interface to obtain policy data for an entity associated with the transaction terminal;
populating a data structure with the policy data; and
determining, using the data structure, the set of identifiers included in the transaction information.

7. The method of claim 1, further comprising:
causing, based on the selection of the user interface element, the user device to open a navigation application and generate directions to a location associated with the transaction.

8. A cloud device, comprising:
one or more memories; and
one or more processors, communicatively coupled to the one or more memories, configured to:
receive, from a transaction terminal, transaction information related to a transaction,
the transaction being completed between the transaction terminal and a user device via near-field communication (NFC);
process the transaction information to identify a set of identifiers included in the transaction information after receiving the transaction information;
determine a score for the transaction based on the set of identifiers included in the transaction information after processing the transaction information;
determine, based on the score and using a machine learning model to process the set of identifiers included in the transaction information, one or more times of interest associated with the transaction,
the one or more times of interest including at least one of:
a deadline for obtaining a refund for an item or a service associated with the transaction,
a deadline for returning the item associated with the transaction, or
a deadline for obtaining store credit for the refund of the item or the service, and
different identifiers or different combinations of identifiers included in the set of identifiers being associated with different times of interest;
prompt, via a display associated with a remote computing device by providing instructions associated with a user interface for display via the display, a user of the remote computing device to indicate whether to generate a calendar reminder for the one or more times of interest after determining the one or more times of interest;
determine a selection of a user interface element associated with the user interface after prompting the user;
generate the calendar reminder based on determining the selection of the user interface element; and
provide, for display based on generating the calendar reminder, a push notification including information identifying the one or more times of interest,
an electronic calendar being populated with the calendar reminder.

9. The cloud device of claim 8, wherein the one or more processors, when determining the one or more times of interest, are configured to:
determine a first time of interest, of the one or more times of interest, for a first transaction based on a first score for a first set of identifiers included in first transaction information for the first transaction; and
determine a second time of interest, of the one or more times of interest, for a second transaction based on a second score for a second set of identifiers included in second transaction information for the second transaction,
the first time of interest and the second time of interest being different,
the first set of identifiers and the second set of identifiers being different, and
the first transaction and the second transaction being a same type of transaction.

10. The cloud device of claim 8, wherein the one or more processors are further configured to:
determine different priorities for the different combinations of identifiers for different transactions; and
wherein the one or more processors, when determining the one or more times of interest, are configured to:
determine different times of interest for the different transactions based on the different priorities for the different combinations of identifiers.

11. The cloud device of claim 8, wherein the one or more times of interest include:
an expiration date of the item associated with the transaction.

12. The cloud device of claim 8, wherein the one or more processors, when determining the one or more times of interest, are configured to:
determine the one or more times of interest from an electronic message associated with an electronic wallet.

13. The cloud device of claim 8, wherein the one or more processors are further configured to:

populate a data structure with information identifying the one or more times of interest; and output, for display, the information identifying the one or more times of interest in association with the transaction information via an electronic wallet associated with the user device.

14. The cloud device of claim 8, where the one or more processors are further to:

cause, based on the selection of the user interface element, the remote computing device to populate a return form associated with obtaining the refund, returning the item, or obtaining the store credit.

15. A non-transitory computer-readable medium storing instructions, the instructions comprising:

one or more instructions that, when executed by one or more processors, cause the one or more processors to:

receive, from a transaction terminal, transaction information related to a transaction, the transaction being completed between the transaction terminal and a user device via near-field communication (NFC);

process the transaction information to identify a set of identifiers included in the transaction information after receiving the transaction information;

determine, after processing the transaction information, a priority for the set of identifiers, and a score for the set of identifiers;

determine, based on the score and using a machine learning model to process the set of identifiers included in the transaction information, one or more times of interest associated with the transaction based on the priority or the score, the one or more times of interest including at least one of:

a deadline for obtaining a refund for an item or a service associated with the transaction, a deadline for returning the item associated with the transaction, or a deadline for obtaining store credit for the refund of the item or the service;

prompt, via a display associated with the user device by providing a user interface for display, a user to indicate whether to generate a calendar reminder or the one or more times of interest;

determine a selection of a user interface element associated with the user interface after prompting the user;

generate the calendar reminder based on determining the selection; and provide, for display based on generating the calendar reminder, a push notification including information identifying the one or more times of interest, an electronic calendar being populated with the calendar reminder after generating the calendar reminder, the electronic calendar being associated with the user.

16. The non-transitory computer-readable medium of claim 15, wherein the one or more instructions, when executed by the one or more processors, further cause the one or more processors to:

detect a location of the user device based on location information from a sensor associated with the user device;

identify a match between a third party location, identified in the transaction information and associated with a third party associated with the transaction, and the location of the user device after detecting the location; and wherein the one or more instructions, that cause the one or more processors to determine the one or more times of interest, cause the one or more processors to:

determine the one or more times of interest after identifying the match between the third party location and the location of the user device.

17. The non-transitory computer-readable medium of claim 15, wherein the one or more instructions, when executed by the one or more processors, further cause the one or more processors to:

identify a particular time for the calendar reminder based on at least one of:

a preference of an account associated with the user, a default preference associated with the account, one or more other calendar reminders associated with the electronic calendar, or a location of the user device; and wherein the one or more instructions, that cause the one or more processors to generate the calendar reminder, cause the one or more processors to:

generate the calendar reminder for the particular time after identifying the particular time.

18. The non-transitory computer-readable medium of claim 15, wherein the one or more instructions, when executed by the one or more processors, further cause the one or more processors to:

prompt, via the user interface, the user for input of a third party identifier associated with the transaction after receiving the transaction information;

determine a match between the third party identifier and an identifier, of the set of identifiers, included in the transaction information based on the input; and wherein the one or more instructions, that cause the one or more processors to determine the one or more times of interest, cause the one or more processors to:

determine the one or more times of interest after determining the match between the third party identifier and the identifier.

19. The non-transitory computer-readable medium of claim 15, wherein the one or more instructions, that cause the one or more processors to determine the at least one of the priority or the score, cause the one or more processors to:

determine different scores for different combinations of identifiers after receiving the transaction information; and wherein the one or more instructions, that cause the one or more processors to determine the one or more times of interest, cause the one or more processors to:

determine different times of interest for the different combinations of identifiers based on the different scores for the different combinations of identifiers.

20. The non-transitory computer-readable medium of claim 15, wherein the one or more instructions, that cause the one or more processors to determine the one or more times of interest, cause the one or more processors to:

determine different times of interest for a same type of transaction based on different combinations of identifiers.

* * * * *